April 3, 1945.  R. ADLER  2,372,640
WATER PURIFYING AND SOFTENING APPARATUS
Filed Nov. 13, 1940  3 Sheets-Sheet 1
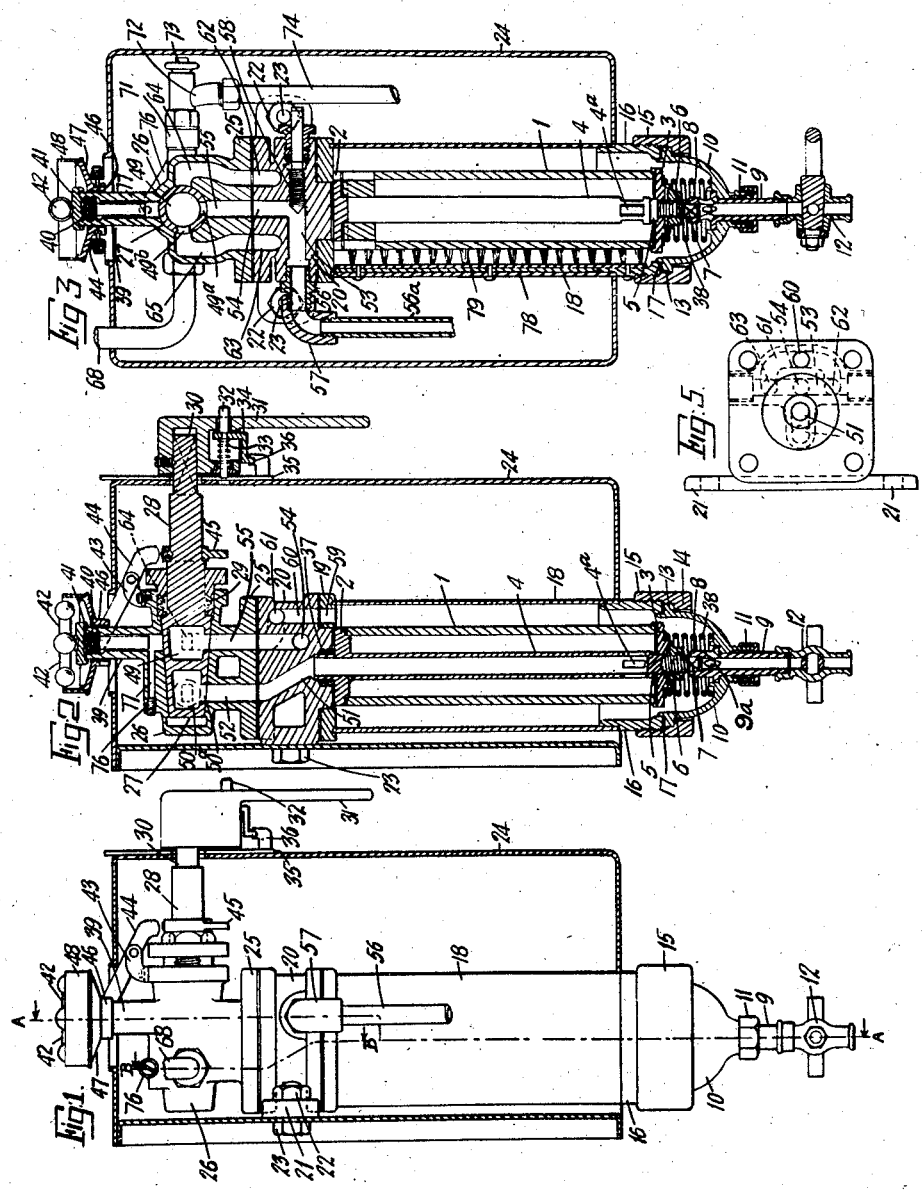
INVENTOR:
Rudolf Adler
BY Thomas W. Y. Clark
ATTORNEY.

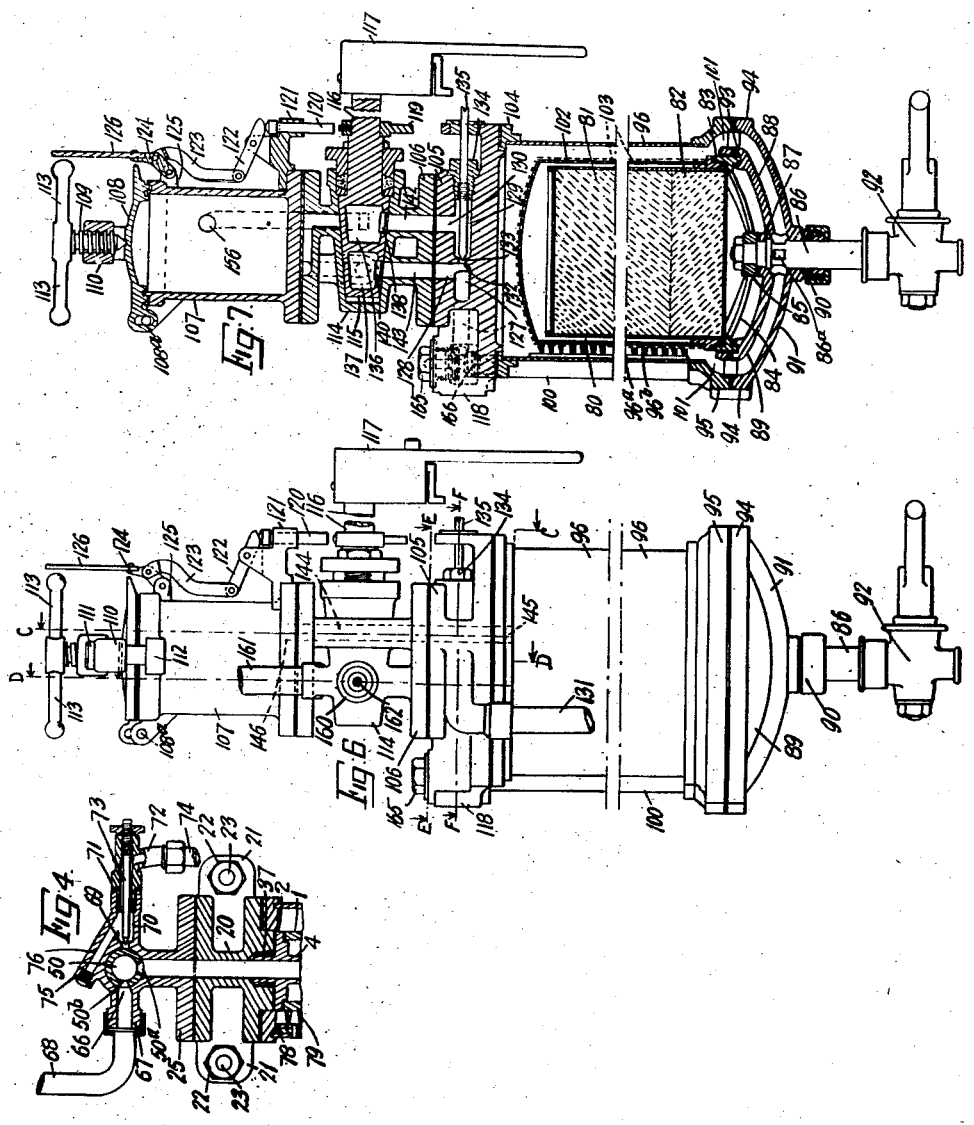

April 3, 1945. R. ADLER 2,372,640
WATER PURIFYING AND SOFTENING APPARATUS
Filed Nov. 13, 1940 3 Sheets-Sheet 3
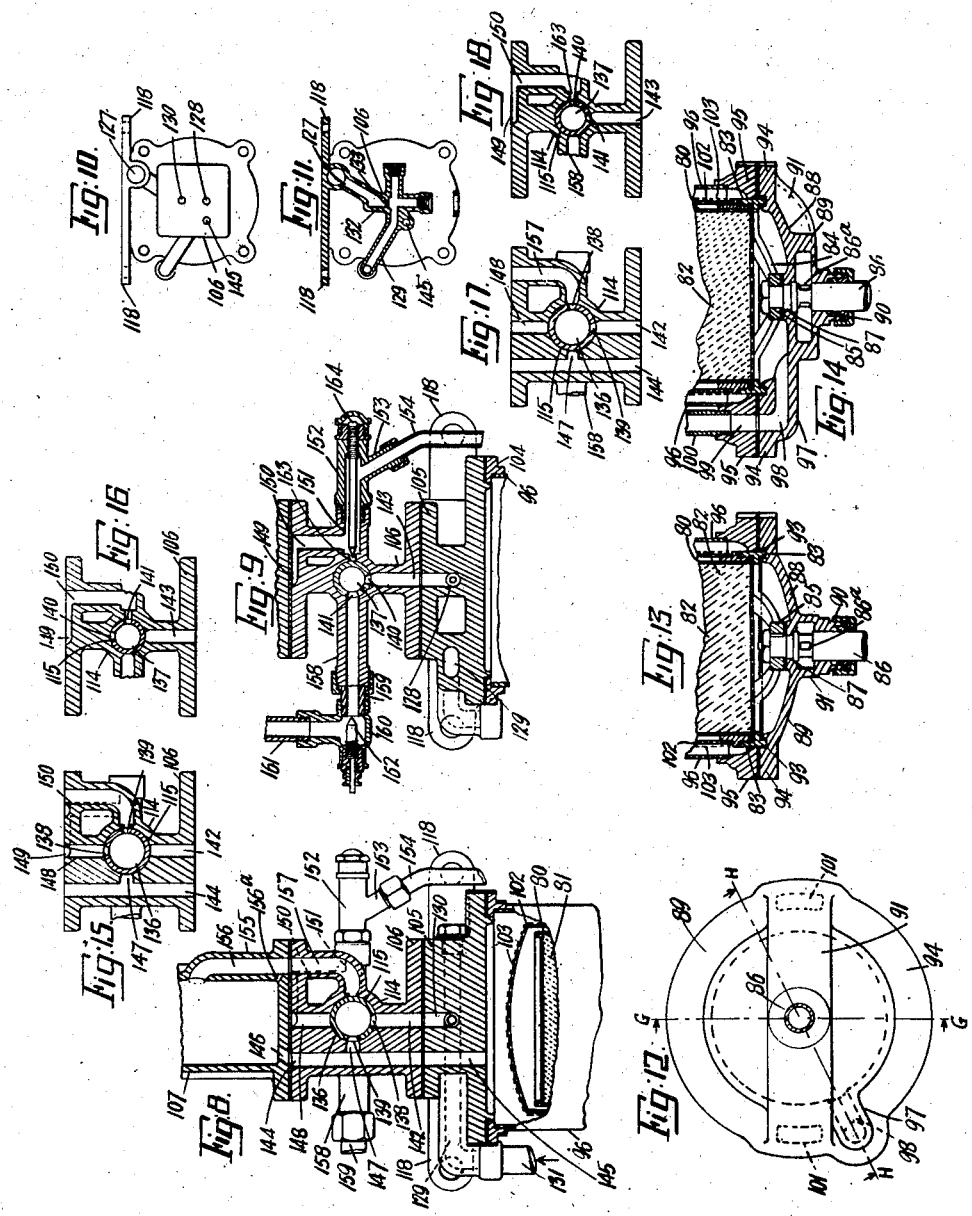

Patented Apr. 3, 1945

2,372,640

UNITED STATES PATENT OFFICE 2,372,640

WATER PURIFYING AND SOFTENING APPARATUS

Rudolf Adler, Montreal, Quebec, Canada

Application November 13, 1940, Serial No. 365,500
In Great Britain November 20, 1939

7 Claims. (Cl. 210—24)

The present invention relates to water purifying and softening apparatus.

In apparatus for this purpose, as hitherto employed, it has been necessary to operate a multiplicity of cocks or valves, when it has been desired to cut off the normal flow of water through the apparatus, in order to insert a filter sterilizing material or a material for reviving the water softening agent, as the case may be, and then re-establish the flow of water through the apparatus in such a manner that it flows through or past the said material, dissolves it, carries it through the filtering medium or softening agent, and then passes out through a waste pipe, after which it is necessary to reset all the cocks or valves to their initial positions, in order for the apparatus to resume its normal function.

The object of the present invention is to simplify the operation and control of the apparatus.

According to the present invention, the apparatus is provided with a single control cock having three positions, the first one of which establishes the normal operation of the apparatus, the second of which positions cuts off the flow of liquid through the apparatus, to permit the aforesaid sterilizing or reviving material to be introduced, as the case may be, the third position of which cock re-establishes the through flow of the water in such a manner that it dissolves (wholly or partly) the said material, and carries it out through the filtering medium or softening agent, thence out through a waste pipe.

Preferably the filtering medium or the softening agent containing assembly is rotatively mounted within the apparatus on a cock controlled tube passing out through a gland in the casing of the apparatus, and provided inside said casing is one or more series of stationary brushes, the bristles of which are so arranged that when said filtering medium or the softening agent containing assembly is rotated through said cock controlled tube, any undesirable deposit which may tend to obstruct the passage of the water through said medium or agent is displaced.

The cock of the cock controlled tube, just referred to, is normally closed, but may be opened when it is desired to drain off or flush away the deposit displaced by the brushes.

From the foregoing statement it will be readily seen that the sterilizing or reviving operation, as the case may be, is carried out independently of the brushing or mechanical operation, and that all of these operations can be effected merely by the manipulation of the single control cock, and the rotation of the aforesaid parts, respectively, without requiring the removing or disassembling of any of the parts directly concerned.

The invention will now be described, by way of example, with reference to the accompanying drawings, in which:

Fig. 1 is a side elevation of a water sterilizer and purifier according to the present invention, the outer box-like housing being shown in section.

Fig. 2 is a sectional elevation.

Fig. 3 is a transverse section on line A—A, Fig. 1.

Fig. 4 is a fragmentary sectional view on line B—B, Fig. 1.

Fig. 5 is a plan, as seen from the underside, of that portion of the apparatus which is interposed between the main control cock and the outer tubular casing containing the filtering body.

Fig. 6 is a side elevation of a water softener according to the present invention.

Fig. 7 is a sectional elevation.

Fig. 8 is a fragmentary sectional view on line C—C, Fig. 6.

Fig. 9 is a similar view on line D—D, Fig. 6.

Fig. 10 is a sectional plan on line E—E, Fig. 6, to a reduced scale, the needle valve, etc. being omitted and the apparatus having been rotated through 90° in a clockwise direction about its vertical axis.

Fig. 11 is a similar view on line F—F, Fig. 6, also to a reduced scale.

Fig. 12 is a plan showing the underside of the bottom casting of the water softener.

Fig. 13 is a fragmentary sectional view on line G—G, Fig. 12.

Fig. 14 is a similar view on line H—H, Fig. 12.

Figs. 15 and 16 are sectional views showing the cock plug in the position in which the salt container can be filled with salt.

Figs. 17 and 18 are similar views showing the cock plug in the position in which the salt is carried into solution and circulated through the water-softening agent to regenerate the latter.

Referring to Figs. 1 to 4 of the accompanying drawings, the water sterilizer and purifier comprises a vertical cylinder 1, of porous (filter) material, clamped and sealed between upper and lower circular plates 2, 3, respectively.

Formed integral with the upper plate 2, extending upwardly from the upper surface thereof for a short distance, and completely down the centre of the cylinder 1, is a tube 4, having at its lower end openings 4a and formed integrally with the lower end of which tube is a solid portion 5 of slightly reduced cross-section, on which is mounted the lower plate 3.

The solid portion 5 is provided at its lower end with a screw-threaded portion 6, which latter is in turn provided at its lower end with a portion 7 of square cross-section.

The portion 7 fits into the internally square shaped upper end 8 of a tube 9, which tube is near its upper end and provided with perforations 9a, and passes down through a perforation formed in a semi-spherical casting 10 which constitutes the bottom of the apparatus, and a gland 11 provided upon the underside of said casting, the protruding lower end of the tube 9 being provided with a drain cock 12 which is normally closed.

The casting 10 is, near its upper or rim portion, provided with an outwardly turned flange 13, which flange is clamped between the inturned flange 14 of a ring 15 and the lower end of a ring 16, a suitable packing washer 17 being inserted to ensure a fluid-tight joint, the said clamping being effected by screwing the ring 15 onto the ring 16.

18 indicates a tubular casing at the lower end of which is carried, in a fluid-tight manner, the ring 16, which casing is in turn carried in a similar manner upon the underside of a ring 19.

Ring 19 is secured to the underside of a block 20 having lugs 21, 21 by which it is secured by nuts 22, and bolts 23, to the rear wall of the box-like casing 24.

To the upper surface of the block 20 is secured a plate 25, which is cast integral with a cock barrel 26, in which barrel is ground a tapered cock plug 27 formed at the inner end of a shaft 28, which shaft passes out from the barrel through a gland 29.

The outer end of the shaft 28 is provided with a square shank 30, which projects through the front of the box-like casing 24, and carries a handle 31.

Carried within the handle 31, at a point near where it is attached to the shank 30, is a pin 32, which is normally maintained so that its outer end projects beyond the outer face of the handle, by a spring 33, in partial compression between a double right angled member 34, upon the pin, and a perforation in the inner wall of the hub or boss of the handle, a plate 35 being provided upon the casing 24, which plate carries a plurality of projections such as 36, with which projections is adapted to engage the member 34, the arrangement being such that the handle cannot be turned from one position into another, without first pressing in the pin 32 and thereby moving the member 34 out of engagement with a projection 36.

The part of the tube 4, which projects upwardly from the aforesaid plate 2, enters into a gland bearing aperture 37 formed in the underside of the block 20, the tube being maintained in this aperture by a spring 38 which is in compression between the inside of the bottom of the casting 10 and the underside of the plate 3.

Cast integral with the upper portion of the cock barrel 26 is an upwardly projecting tubular portion 39, the upper end of which is normally closed by a screwed plug 40, bearing at its upper end a cap 41 carrying radial handles 42.

Carried upon the cock barrel 26 is a bracket 43, to which is pivoted an inclined lever 44, the lower arm of which lever engages a cam 45, mounted upon the cock shaft 28, and the upper arm of which lever engages a sleeve 46 slidingly arranged upon the tubular portion 39.

Formed integral with the upper end of the sleeve 46 is a plate 47, which carries a ring 48, which normally surrounds and prevents ready access to the radial arms 42 of the plug 40, the cam 45 being so shaped that when the cock is turned into a certain position, which will later be described, the ring is automatically lowered to give access to the arms.

Formed in the cock plug 27 are chambers 49, 50, the chamber 49 being provided with ports or openings 49a, 49b, and the chamber 50 with ports 50a, 50b, as shown respectively in Figs. 3 and 4.

Formed in the block 20, in such a manner that its lower end communicates with the aperture 37, is a passage 51, the upper end of which passage communicates with the lower end of a passage 52.

The passage 52, at its upper end, communicates with the interior of the cock barrel 26, at a point in the circular path of movement of the ports 50a, 50b.

Drilled through, from one side to the other, of the block 20 is a passage 53, which at its middle portion communicates with the lower end of a vertical passage 54, the upper end of which passage 54 communicates with the lower end of a passage 55, the upper end of which passage in turn communicates with the cock barrel 26 at a point in the path of rotation of the ports 49a, 49b.

Connected by unions 56 and 57 to one end of the passage 53 is the end of a liquid delivery pipe 56a, and screwed into the other end of the passage 53, is a valve 58 (Fig. 3) having an outwardly extending spindle by which the valve can be screwed in and out to enlarge or decrease the effective area of the point of communication between the passage 53, and the passage 54.

Formed in the ring 19 is a perforation 59, which at the lower side of the ring communicates with the tubular casing 18 and at the upper side with the lower end of a passage 60 formed in the block 20.

The upper end of the passage 60 communicates with a passage 61, which extends, horizontally, round the front upper portion of the block 20, as shown by the interrupted lines in Fig. 5, from the lower end of a passage 62 to the lower end of a passage 63.

At its upper end the passage 62 communicates with the lower end of a passage 64, the upper end of which passage 64 in turn communicates with the inside of the cock barrel 26 at a point in the path of rotary movement of the ports 49a, 49b, at one side of the barrel (see Fig. 3), a similar passage, indicated by 65, leading from the upper end of the passage 63 to the diametrically opposite part of the said barrel.

Formed in the barrel 26 and disposed in the path of movement of the ports 50a, 50b, is an opening 66 (see Fig. 4), which at its outer side communicates with a tubular portion 67 cast integral with the barrel and having connected to its outer end a pipe 68.

Formed in the diametrically opposite portion of the barrel 26 to that at which is formed the opening 66 is an opening 69 communicating with a tubular portion 70 cast upon the barrel, into the end of which tubular portion is screwed a hollow member 71 from which branches a hollow boss 72.

Into the member 71 is screwed a needle valve 73, the purpose of which is to adjust the effective size of the opening 69.

Screwed into the hollow boss 72 is the end of a pipe 74. Cast upon the rear upper portion of the barrel 26 is a portion 75 in which is drilled passages 76, 77, which constitute a permanent communication between the lower end of the previously described tubular portion 39 and the tubular portion 70, and permit any liquid to drain from said portion 39.

When the cock plug 27 is turned into the position in which it is shown in Figs. 2, 3, and 4, the liquid to be purified passes up from the inlet tube 56, passages 53, and 54, port 49a, into chamber 49, out of the latter, by way of port 49b, thence down passage 65, along passage 61, down passage 60, and, through perforation 59, into the tubular casing 13.

From the casing 19, the liquid passes through the porous wall of the cylinder 1, where the filtering is effected, the filtered liquid then passing into and up the tube 4, via the perforations 4a.

The filtered liquid, after leaving the upper end of the tube 4, passes up the passages 51 and 52, through port 50a, of the cock plug 27, into the chamber 50, thence out through the port 50b, opening 66, tubular portion 67, and finally out through the delivery tube 68.

After the purifier has been in operation for a while, it is necessary to sterilize the apparatus, and, in particular the porous cylinder 1.

By rotating the cock plug 27 through 180° in a clockwise direction from the position in which it is shown in Figs. 2, 3 and 4, the inflow of water from the passages 54 and 53 and supply pipe 56 is cut off, and the cam 45 causes the ring 40 to drop and permit access to the handles 42 of the plug 40, to thereby permit this plug to be removed, this rotation of the plug 27 having brought the ports 49a, 49b, respectively, into direct communication with the tubular portion 39, and the passage 64.

The rotation of the plug 27, as just described, has closed the port 50a against the inner surface of the upper portion of the barrel 26, and has brought the port 50b into direct communication with the opening 69.

A sterilizing tablet is now dropped into the tubular portion 39, from which it falls, through port 49a, into the chamber 49.

The upper end of the tubular portion 39 is then closed, by replacing the plug 40, after which the cock plug 27 is further rotated in a clockwise direction by 90°, this further rotation causing the ring 40 to be raised again into its normal position.

This further rotation of the cock plug 27 also brings the ports 49a and 49b, respectively, into direct communication with the passages 64 and 55, and the ports 50a, 50b, respectively, into direct communication with the opening 69 and the passage 51.

The result of this last mentioned rotation of the cock plug 27 is that liquid flows from the passages 54, 53, and the supply pipe 56, through port 49b, chamber 49 (where it dissolves the tablet), port 49a, passages 64, 62, 61 and 60, thence through the perforation 59 into the tubular casing 13.

The liquid within the casing 16 then passes through the walls of the cylinder 1, then by way of perforation 4a, up the tube 4, from the upper end of which tube it passes up passages 51 and 52, through port 50b, chamber 50, port 50a, opening 66, tubular portion 70, and finally out through pipe 74.

From the foregoing description, it will be seen that there are three positions in which the cock plug 27 may be turned. Firstly the position shown in Figs. 2, 3 and 4, which causes the normal operation of the apparatus, secondly the position angularly displaced in a clockwise direction by 180° from the first position in which the flow of water through the apparatus is cut off and the tablet or other sterilizing substance is inserted, and thirdly, the position in which the plug 27 is rotated in the same direction, by a further 90° for causing the sterilization of the apparatus. A rotation of the cock by a further 90° will then re-establish the normal flow and purification (filtering) action of the apparatus.

Provided upon the inner wall of the tubular casing 13 is a strip 78 carrying inwardly projecting bristles 79 which engage with the outer surface of the cylinder 1, the arrangement being such that by rotating the cylinder through the cock 12 and pipe 9 the bristles will brush any filtered out solid matter from the said outer surface, and by opening the cock 12 this will drain off under its own weight or under fluid pressure according to whether the cock plug 27 is set in its second or third position. Preferably a plurality of these brushes is arranged at regular intervals within the casing 13, so that the mechanical cleaning effect can be obtained by limited angular movements of the cylinder 1 in both directions.

Referring to Figs. 6 to 13, the water softening apparatus comprises a drum 80 having perforated upper and lower ends and containing the water softening agent 81, beneath which is situated a layer of gravel 82.

The drum 80 is carried around its lower end by a ring 83 forming part of a spider 84, the hub 85 of which spider is secured upon the upper end of a spindle 86 which passes downwardly through a fluid tight bearing 87 in the wall 88 of a casting 89 which constitutes the bottom of the apparatus, the said spindle then extending down through a gland 90 in the lower wall of a hollow web 91 formed upon the underside of the casting (see also Figs. 12 to 14).

The part of the spindle 86 within and extending down from the hollow web 91 is hollow, and the position within said web is provided with latrel openings 86a. Provided at the lower end of the spindle is a drain cock 92, which is normally in the closed position.

Formed around the casting 89 is an annular groove 93 in which rests in a liquid-tight manner the under edge of the ring 83, the arrangement being such that when the spindle 86 is rotated the spider 84, ring 83 and drum 80 will also be rotated.

Extending around the outside of the annular groove 93 and around the ends of the hollow web 91, is a horizontal flange 94 upon which is fixed in a liquid-tight manner a ring 95 into which ring is similarly secured the lower end of an outer casing 96. Formed integral with the underside of the casting 89 is a radial projection 97 (Figs. 12 and 14) in which is formed a passage 98, the inner end of which communicates with the inside of the said casting, and the other end of which passes upwardly through the flange 94 and communicates with the lower end of a passage 99 formed in the ring 95.

Screwed into the upper end of the passage 99 is the lower end of a pipe 100.

The diametrically opposite ends of the hollow web 91 communicate with the lower ends of passages 101 (Fig. 12) formed within the ring 95, the upper ends of which passages 101 communicate with the inside of the bottom of the outer casing 96 at points exterior to the ring 83 and drum 80, the bottom perforated lower end of which latter, it is to be noted, is sealed by means of the ring 83, resting in the annular groove 93, to the inside of the portion of the casting 89 which is in communication with the inner end of the passage 98.

Carried upon the ring 83 is a perforated cylinder 102, which is of somewhat greater internal dimensions than the external dimensions of the drum 80 and encloses the latter.

Provided upon the outside of the cylinder 102 is a filter cloth 103, indicated by interrupted lines.

Mounted upon the upper end of the casing 96 is a ring 104 upon which is secured in a liquid-tight manner a block 105, superimposed by the main cock casting, indicated generally by 106.

Mounted upon the casting 106 is a salt container 107, which is normally closed at its upper end by a lid 108, held firmly in position by a spindle 109 screwed downwardly through a transverse member 110 carried at each of its ends by a pin such as 111 carried by lugs such as 112 cast upon the container, the said member being pivoted to one of these pins but at its other end provided with an open sided slot (not shown) to enable it to be swung into and out of engagement with the appropriate pin.

The aforementioned plate or cover 108, which forms a liquid tight joint upon the upper end of the container 107 is hinged or pivoted to the said container at 108a.

Provided upon the upper end of the spindle 109 are radial handles 113.

114 indicates the main cock barrel, 115 the plug, and 116 the operating spindle with which the plug is formed integral, and which spindle at its outer end carries the handle 117, which is provided with the same positioning and locking arrangement as the hereinbefore described purifier, the outer box-like case, however, and the plate and projections carried thereby, having been omitted for the sake of clearness.

Provided upon the block 105 are lugs 118 (Figs. 8 and 9) by which the apparatus is bolted to the rear wall of the outer box-like case which, as just described, is not shown.

Carried upon the cock spindle 116 is a cam 119 which engages with the lower end of a tappet 120 carried in a bracket 121 fixed to the salt container 107, to which bracket is pivoted a lever 122, with the outer end of which engages the head of the tappet.

Connected to the inner end of the lever 122 is the lower end of a link 123, the upper end of which link is pivoted to the middle of an arm 124, in turn pivoted at one of its ends to a lug 125, cast upon the container 107, and at its other end carrying a plate 126 which normally obstructs ready access to the handles 113.

Formed in the block 105 is a passage 127, the inner end of which communicates with a vertical passage 128, and the outer end of which connects with the upper end of the pipe 100, and also formed in the block is a passage 129 which at its inner end communicates with a vertical passage 130, and is at its outer end connected to a pipe 131, which latter constitutes the liquid inlet pipe (Figs. 10 and 11).

The inner ends of the passages 127 and 129 are separated from each other by a wall 132 having a perforation 133, and screwed into a bush 134, in turn screwed into the block 105, is a needle valve 135, which can be screwed in or out, to vary the effected size of said perforation from zero to maximum, for a purpose which will be hereinafter described.

The plug 115 is provided with two chambers, indicated respectively by 136 and 137, the chamber 136 being provided with ports 138 and 139, and the chamber 137 with ports 140 and 141.

Communicating with the upper end of the vertical passage 130 and that portion of the interior of the cock barrel 114 on the path of rotation of the ports 138 and 139, is a passage 142, and communicating between the upper end of the vertical passage 128 and the portion of the interior of said barrel on the path of rotation of the ports 140 and 141 is a passage 143.

Formed in the cock casting is a vertical passage 144 (Figs. 8, 15 and 17) the lower end of which communicates with a similar passage 145 extending completely through the block 105, the upper end of the passage 144 communicating with the interior of the bottom of the container 107, through a perforation 146.

Extending between the portion of the interior of the cock barrel 114 which is in the path of rotation of the ports 138 and 139, and the passage 144 is a horizontal passage 147 (Fig. 8).

148 indicates a passage arranged coaxially with the passage 142 and extending upwardly from the cock plug 115 to one end of a passage 149 channeled in the upper surface of the casting 106, the opposite end of which passage 149 connects with the upper end of a vertical passage 150, as shown more clearly in Figs. 9, 16 and 18.

The lower end of the passage 150 joins a horizontal passage 151 (Figs. 8 and 9) into the outer end of which is screwed a bush 152, cast integral with which is a tubular branch 153 connected to the upper end of a pipe 154.

Formed in a protuberance 155 cast upon the container 107 is a passage 156, the upper end of which passage opens into the upper part of the said container.

The lower end of the passage 156 connects with the upper end of the passage 157 in the cock casting 106, the lower end of which passage 157 in turn opens into the barrel 114 at a point diametrically opposite to the passage 147.

Formed upon the cock casting 106 is a horizontal tubular member 158, the inner end of which communicates with the barrel 114 at a point in the path of movement of the ports 140 and 141.

To the outer end of the tubular member 158, is connected, by unions 159 and 160, a pipe 161, the union 160 being provided with a valve 162, by which the rate at which fluid passes through the union may be controlled.

Formed in the cock barrel 114, at a point diametrically opposite to the member 158 is a perforation 163 which establishes a connection between the inner end of the aforesaid passage 151 and the inside of the said barrel, a needle valve 164 being screwed into the bush 152, by means of which valve the effected area of the said perforation may be adjusted.

Provided within the passage 127, beneath a manhole, fitted with a screwed plug 165, is a valve 166, shown in interrupted lines in Fig. 7, by which valve the rate of flow of fluid along the pipe 100 may be regulated.

When the cock barrel plug 115 is in the position in which it is shown in Figs. 7, 8 and 9, liquid 73, the purpose of which is to adjust the effective size of the opening 68.

Screwed into the hollow boss 72 is the end of a pipe 74. Cast upon the rear upper portion of the barrel 26 is a portion 75 in which is drilled passages 76, 77, which constitute a permanent communication between the lower end of the previously described tubular portion 39 and the tubular portion 70, and permit any liquid to drain from said portion 39.

When the cock plug 27 is turned into the position in which it is shown in Figs. 2, 3, and 4, the liquid to be purified passes up from the inlet tube 56, passages 53, and 54, port 49a, into chamber 49, out of the latter, by way of port 49b, thence down passage 65, along passage 61, down passage 60, and, through perforation 59, into the tubular casing 18.

From the casing 18, the liquid passes through the porous wall of the cylinder 1, where the filtering is effected, the filtered liquid then passing into and up the tube 4, via the perforations 4a.

The filtered liquid, after leaving the upper end of the tube 4, passes up the passages 51 and 52, through port 50a, of the cock plug 27, into the chamber 50, thence out through the port 50b, opening 66, tubular portion 67, and finally out through the delivery tube 68.

After the purifier has been in operation for a while, it is necessary to sterilize the apparatus, and, in particular the porous cylinder 1.

By rotating the cock plug 27 through 180° in a clockwise direction from the position in which it is shown in Figs. 2, 3 and 4, the inflow of water from the passages 54 and 53 and supply pipe 56 is cut off, and the cam 45 causes the ring 43 to drop and permit access to the handles 42 of the plug 40, to thereby permit this plug to be removed, this rotation of the plug 27 having brought the ports 49a, 49b, respectively, into direct communication with the tubular portion 39, and the passage 64.

The rotation of the plug 27, as just described, has closed the port 50a against the inner surface of the upper portion of the barrel 26, and has brought the port 50b into direct communication with the opening 69.

A sterilizing tablet is now dropped into the tubular portion 39, from which it falls, through port 49a, into the chamber 49.

The upper end of the tubular portion 39 is then closed, by replacing the plug 40, after which the cock plug 27 is further rotated in a clockwise direction by 90°, this further rotation causing the ring 43 to be raised again into its normal position.

This further rotation of the cock plug 27 also brings the ports 49a and 49b, respectively, into direct communication with the passages 64 and 55, and the ports 50a, 50b, respectively, into direct communication with the opening 69 and the passage 51.

The result of this last mentioned rotation of the cock plug 27 is that liquid flows from the passages 54, 53, and the supply pipe 56, through port 49b, chamber 49 (where it dissolves the tablet), port 49a, passages 64, 62, 61 and 60, thence through the perforation 59 into the tubular casing 18.

The liquid within the casing 18 then passes through the walls of the cylinder 1, then by way of perforation 4a, up the tube 4, from the upper end of which tube it passes up passages 51 and 52, through port 50b, chamber 50, port 50a, opening 66, tubular portion 70, and finally out through pipe 74.

From the foregoing description, it will be seen that there are three positions in which the cock plug 27 may be turned. Firstly the position shown in Figs. 2, 3 and 4, which causes the normal operation of the apparatus, secondly the position angularly displaced in a clockwise direction by 180° from the first position in which the flow of water through the apparatus is cut off and the tablet or other sterilizing substance is inserted, and thirdly, the position in which the plug 27 is rotated in the same direction, by a further 90° for causing the sterilization of the apparatus. A rotation of the cock by a further 90° will then re-establish the normal flow and purification (filtering) action of the apparatus.

Provided upon the inner wall of the tubular casing 18 is a strip 78 carrying inwardly projecting bristles 79 which engage with the outer surface of the cylinder 1, the arrangement being such that by rotating the cylinder through the cock 12 and pipe 9 the bristles will brush any filtered out solid matter from the said outer surface, and by opening the cock 12 this will drain off under its own weight or under fluid pressure according to whether the cock plug 27 is set in its second or third position. Preferably a plurality of these brushes is arranged at regular intervals within the casing 18, so that the mechanical cleaning effect can be obtained by limited angular movements of the cylinder 1 in both directions.

Referring to Figs. 6 to 13, the water softening apparatus comprises a drum 80 having perforated upper and lower ends and containing the water softening agent 81, beneath which is situated a layer of gravel 82.

The drum 80 is carried around its lower end by a ring 83 forming part of a spider 84, the hub 85 of which spider is secured upon the upper end of a spindle 86 which passes downwardly through a fluid tight bearing 87 in the wall 88 of a casting 89 which constitutes the bottom of the apparatus, the said spindle then extending down through a gland 90 in the lower wall of a hollow web 91 formed upon the underside of the casting (see also Figs. 12 to 14).

The part of the spindle 86 within and extending down from the hollow web 91 is hollow, and the position within said web is provided with latrel openings 86a. Provided at the lower end of the spindle is a drain cock 92, which is normally in the closed position.

Formed around the casting 89 is an annular groove 93 in which rests in a liquid-tight manner the under edge of the ring 83, the arrangement being such that when the spindle 86 is rotated the spider 84, ring 83 and drum 80 will also be rotated.

Extending around the outside of the annular groove 93 and around the ends of the hollow web 91, is a horizontal flange 94 upon which is fixed in a liquid-tight manner a ring 95 into which ring is similarly secured the lower end of an outer casing 96. Formed integral with the underside of the casting 89 is a radial projection 97 (Figs. 12 and 14) in which is formed a passage 98, the inner end of which communicates with the inside of the said casting, and the other end of which passes upwardly through the flange 94 and communicates with the lower end of a passage 99 formed in the ring 95.

Screwed into the upper end of the passage 99 is the lower end of a pipe 100.

The diametrically opposite ends of the hollow web 91 communicate with the lower ends of passages 101 (Fig. 12) formed within the ring 95, the upper ends of which passages 101 communicate with the inside of the bottom of the outer casing 96 at points exterior to the ring 83 and drum 80, the bottom perforated lower end of which latter, it is to be noted, is sealed by means of the ring 83, resting in the annular groove 93, to the inside of the portion of the casting 89 which is in communication with the inner end of the passage 98.

Carried upon the ring 83 is a perforated cylinder 102, which is of somewhat greater internal dimensions than the external dimensions of the drum 80 and encloses the latter.

Provided upon the outside of the cylinder 102 is a filter cloth 103, indicated by interrupted lines.

Mounted upon the upper end of the casing 96 is a ring 104 upon which is secured in a liquid-tight manner a block 105, superimposed by the main cock casting, indicated generally by 106.

Mounted upon the casting 106 is a salt container 107, which is normally closed at its upper end by a lid 108, held firmly in position by a spindle 109 screwed downwardly through a transverse member 110 carried at each of its ends by a pin such as 111 carried by lugs such as 112 cast upon the container, the said member being pivoted to one of these pins but at its other end provided with an open sided slot (not shown) to enable it to be swung into and out of engagement with the appropriate pin.

The aforementioned plate or cover 108, which forms a liquid tight joint upon the upper end of the container 107 is hinged or pivoted to the said container at 108a.

Provided upon the upper end of the spindle 109 are radial handles 113.

114 indicates the main cock barrel, 115 the plug, and 116 the operating spindle with which the plug is formed integral, and which spindle at its outer end carries the handle 117, which is provided with the same positioning and locking arrangement as the hereinbefore described purifier, the outer box-like case, however, and the plate and projections carried thereby, having been omitted for the sake of clearness.

Provided upon the block 105 are lugs 118 (Figs. 8 and 9) by which the apparatus is bolted to the rear wall of the outer box-like case which, as just described, is not shown.

Carried upon the cock spindle 116 is a cam 119 which engages with the lower end of a tappet 120 carried in a bracket 121 fixed to the salt container 107, to which bracket is pivoted a lever 122, with the outer end of which engages the head of the tappet.

Connected to the inner end of the lever 122 is the lower end of a link 123, the upper end of which link is pivoted to the middle of an arm 124, in turn pivoted at one of its ends to a lug 125, cast upon the container 107, and at its other end carrying a plate 126 which normally obstructs ready access to the handles 113.

Formed in the block 105 is a passage 127, the inner end of which communicates with a vertical passage 128, and the outer end of which connects with the upper end of the pipe 100, and also formed in the block is a passage 129 which at its inner end communicates with a vertical passage 130, and is at its outer end connected to a pipe 131, which latter constitutes the liquid inlet pipe (Figs. 10 and 11).

The inner ends of the passages 127 and 129 are separated from each other by a wall 132 having a perforation 133, and screwed into a bush 134, in turn screwed into the block 105, is a needle valve 135, which can be screwed in or out, to vary the effected size of said perforation from zero to maximum, for a purpose which will be hereinafter described.

The plug 115 is provided with two chambers, indicated respectively by 136 and 137, the chamber 136 being provided with ports 138 and 139, and the chamber 137 with ports 140 and 141.

Communicating with the upper end of the vertical passage 130 and that portion of the interior of the cock barrel 114 on the path of rotation of the ports 138 and 139, is a passage 142, and communicating between the upper end of the vertical passage 128 and the portion of the interior of said barrel on the path of rotation of the ports 140 and 141 is a passage 143.

Formed in the cock casting is a vertical passage 144 (Figs. 8, 15 and 17) the lower end of which communicates with a similar passage 145 extending completely through the block 105, the upper end of the passage 144 communicating with the interior of the bottom of the container 107, through a perforation 146.

Extending between the portion of the interior of the cock barrel 114 which is in the path of rotation of the ports 138 and 139, and the passage 144 is a horizontal passage 147 (Fig. 8).

148 indicates a passage arranged coaxially with the passage 142 and extending upwardly from the cock plug 115 to one end of a passage 149 channeled in the upper surface of the casting 106, the opposite end of which passage 149 connects with the upper end of a vertical passage 150, as shown more clearly in Figs. 9, 16 and 18.

The lower end of the passage 150 joins a horizontal passage 151 (Figs. 8 and 9) into the outer end of which is screwed a bush 152, cast integral with which is a tubular branch 153 connected to the upper end of a pipe 154.

Formed in a protuberance 155 cast upon the container 107 is a passage 156, the upper end of which passage opens into the upper part of the said container.

The lower end of the passage 156 connects with the upper end of the passage 157 in the cock casting 106, the lower end of which passage 157 in turn opens into the barrel 114 at a point diametrically opposite to the passage 147.

Formed upon the cock casting 106 is a horizontal tubular member 158, the inner end of which communicates with the barrel 114 at a point in the path of movement of the ports 140 and 141.

To the outer end of the tubular member 158, is connected, by unions 159 and 160, a pipe 161, the union 160 being provided with a valve 162, by which the rate at which fluid passes through the union may be controlled.

Formed in the cock barrel 114, at a point diametrically opposite to the member 158 is a perforation 163 which establishes a connection between the inner end of the aforesaid passage 151, and the inside of the said barrel, a needle valve 164 being screwed into the bush 152, by means of which valve the effected area of the said perforation may be adjusted.

Provided within the passage 127, beneath a manhole, fitted with a screwed plug 165, is a valve 166, shown in interrupted lines in Fig. 7, by which valve the rate of flow of fluid along the pipe 100 may be regulated.

When the cock barrel plug 115 is in the position in which it is shown in Figs. 7, 8 and 9, liquid passes into the apparatus by the pipe 131, passages 129, 130 and 142, thence through port 138, port 139 and passages 147, 144 and 145 into the casing 96.

The liquid then passes through the filter cloth 103, the perforations of the walls of the cylinder 102, the perforated upper end of the drum 80, and downwardly through the layer of softening agent 81.

The softened water, after leaving the layer 81, passes through the layer of gravel 82, then out through the perforated bottom wall of the drum 80 into the casting 89.

From the casting 89, the softened water passes through passages 98, 99, pipe 100, passages 127, 128 and 143, thence through port 140, chamber 137 port 141, unions 159, 160 and, finally, out through pipe 161.

When it is desired to reactivate the softening agent the cock barrel 115 is turned into the position shown in Figs. 15 and 16 (its second position) which cuts off the supply of liquid from the pipe 131 and causes the plate 126 to drop in order to permit ready access to the handles 113.

The spindle 109 is then unscrewed, and, after the transverse member 110 has been swung clear, the lid 108 is swung open upon its pivot 108a.

It is to be noted that the turning of the barrel 115 into the position just described permits any liquid within the container 107 to drain through a perforation 156a into the passage 156, through port 139, chamber 136, port 138, passages 148, 149 and 150, into the passage 151 and bush 152, whence it flows out through branch 153 and pipe 154.

The container 107 is then filled with salt, after which the lid 108 is carefully replaced and fixed correctly in position.

The cock barrel 115 is then rotated into its third position in which it is shown in Figs. 17 and 18, and this permits liquid from passages 142, 130, 129 and pipe 131 to pass through port 139, chamber 136, port 138, passages 157 and 156, into the container 107 where it mixes with and dissolves the salt.

The salt solution thus formed passes through the bottom of the container 107, down passages 144 and 145, into the casing 96, thence through filter cloth 103, the perforations of the cylinder 102, the upper perforated end wall of the drum 80 down through the layer of softening agent (which it reactivates), then through the layer of gravel 82, and through the perforated bottom wall of the said drum, into the casting 89.

The solution leaves the casting 89 by way of passages 98, 99 and pipe 100, from which latter it passes through passages 127, 128, 143, thence by way of port 141, chamber 137, port 140 and opening 163, into passage 151 and bush 152, and, finally, out through branch 153 and pipe 154.

Provided within the casing 96 are strips such as 96a carrying bristles 96b which engage with the filter cloth 103, in order that when the filtering and softening assembly is rotated with the ring 83, by twisting the spindle 86, any deposit upon the outer surface of the filter cloth may be brushed off and flushed or drained through the drain cock 92.

Having now particularly described and ascertained the nature of my said invention, and in what manner the same is to be performed, I declare that what I claim is:

1. Water treating apparatus comprising a treating chamber, a water inlet, a treated water outlet and a waste water outlet, means to permit the introduction of a regenerating substance, and a plug and barrel cock through which water passes, connections between said cock barrel and said chamber, inlet, outlets and means, characterized in the plug is provided with two axially in line chambers, each chamber being closed at its ends and having two ports angularly displaced and arranged to cooperate with said barrel connections, in one position of the cock plug to pass water from the inlet to the treated water outlet, through the treating chamber, in another position to close the water inlet and outlets and to permit the introduction through said means of a regenerating substance, and in a third position, to pass water from the inlet to the waste water outlet, through the treating chamber, the water in passing to the treating chamber, entraining the regenerating substance and in said first and third positions, the ports of each chamber being alternately employed as inlet and outlet ports, every other position of the plug in its rotation closing the apparatus to prevent the passage of water therethrough.

2. Water treating apparatus according to claim 1 wherein the means to permit the introduction of a regenerating substance comprises a chamber which is normally closed, and which may be opened when the cock is in its second position and which then is in communication with one of the plug chambers.

3. Water treating apparatus according to claim 1 wherein the cock plug is revolvable and each of the chambers therein has two ports displaced by approximately 90° one port in one chamber cooperating in the first and third positions of the cock plug with the water inlet and one port in the other chamber cooperating with the respective water outlets.

4. The apparatus of claim 1 wherein the cock plug is revolvable and the plug and barrel have substantial contacting surfaces, broken only by the two ports in each plug chamber and their connecting ports in the barrel.

5. The apparatus of claim 1 wherein the cock plug is revolvable and the plug and barrel have tapering contacting surfaces and the plug is longitudinally movable in both directions, whereby wear of the contacting surfaces may be compensated for by forcing the plug further into the barrel.

6. The apparatus of claim 1 wherein water entering the inlet always passes through the treating chamber.

7. In a water treating apparatus a cock as described in claim 1, the cock plug being so arranged within the cock barrel that there is in all operating positions a segment of at least approximately 90° between ports of the cock barrel.

RUDOLF ADLER.